US006956563B2

(12) United States Patent
Yamashita

(10) Patent No.: US 6,956,563 B2
(45) Date of Patent: Oct. 18, 2005

(54) TOUCH PANEL INSPECTION DEVICE

(75) Inventor: Shunichi Yamashita, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 226 days.

(21) Appl. No.: 10/408,354

(22) Filed: Apr. 8, 2003

(65) Prior Publication Data

US 2003/0189555 A1 Oct. 9, 2003

(30) Foreign Application Priority Data

Apr. 8, 2002 (JP) .......................................... 2002-105113

(51) Int. Cl.$^7$ .............................................. G09G 5/00
(52) U.S. Cl. ...................................... 345/173; 345/904
(58) Field of Search .................................. 345/173, 904

(56) References Cited

U.S. PATENT DOCUMENTS 5,339,093 A * 8/1994 Kumagai et al. ............. 345/89

FOREIGN PATENT DOCUMENTS

| JP | 9-114578 A | 5/1997 |
| JP | 10-116147 A | 5/1998 |
| JP | 11-119900 A | 4/1999 |

* cited by examiner

Primary Examiner—Richard Hjerpe
Assistant Examiner—Rodney Amadiz
(74) Attorney, Agent, or Firm—Sughrue Mion, PLLC

(57) ABSTRACT

There is provided a highly versatile touch panel inspection device. The touch panel inspection device comprises a stage 1 having a mounting surface, two column members 3, 4 disposed on the stage and extended upward from the stage, a rail member 2 disposed above the stage approximately in parallel to the mounting surface of the stage while both ends thereof are locked to the column members by locking means 32, a support member 5 supported rotatably around the rail member, an arm member 6 having a predetermined length and integrally engaged with the support member in vertical to the rail member, and a pen member 7 having an approximately conical tip and engaged with a tip of the arm member. The locking means 32 is movable up and down along the column members with respect to the stage, and locks the rail member in optional positions of the column members.

8 Claims, 5 Drawing Sheets

TOUCH PANEL INSPECTION DEVICE

BACKGROUND OF THE INVENTION

1. Field of the Invention

The present invention relates to a touch panel inspection device, and more particularly to a touch panel inspection device used for evaluating destruction durability performance of a pressure-sensitive touch panel using a resistance film.

2. Description of the Related Art

Conventionally, a pressure-sensitive touch panel using a resistance film has been widely used as an input device for computers, as shown in JP(A)-10-116147.

As shown in FIG. 3, the pressure-sensitive touch panel includes a film 102, a glass plate 103, and transparent conductive films 104A, 104B disposed on inner surfaces of the film 102 and glass plate 103 respectively. The conductive films 104A, 104B are respectively provided with conductors 105A, 105B, which are located at the four side ends of the film 102 and glass 103 and covered with insulators 106A, 106B. A double-sided adhesive tape 107 is disposed between the insulators 106A, 106B, and spacers 108 are disposed at fixed intervals on the conductive film 104B of the glass plate 103 side. Accordingly, the conductive films 104A, 104B are fixed together through the insulators 106A, 106B and the double-sided adhesive tape 107 while keeping a certain gap. Such a touch panel is disposed in a casing 101 to form a touch panel device.

An electric potential distribution is formed in the conductive film 104A by applying suitable voltage thereon in a direction along a film surface through the conductor 105A, and another electric potential distribution is formed in the conductive film 104B by applying suitable voltage thereon in another direction along a film surface through the conductor 105B. When a dedicated pen (not shown) is put on the surface of the film 102, at such a pen-touched position the film 102 and conductive film 104 are deformed downward and the conductive film 104A becomes in contact with the conductive film 104B to become short-circuited. The pen-touched positions with respect to the above two directions can be determined by detecting the voltage values applied through the conductors 105A, 105B respectively at the short-circuited state.

Thus, when the pen is slid or put on the touch panel, the film 102 is bent by using as a fulcrum a portion of the four side ends of the film 102 and glass 103 where the conductors 105A, 105B, the insulators 106A, 106B and the double-sided adhesive tape 107 are disposed. Then, if a pen sliding position is near the portion of the four side ends of the film 102 and glass 103, the bending of the film 102 becomes sharper to cause damage such as tear of the transparent conductive film 104A in the film 102 side.

Thus, as to an area of the touch panel used for the input and display screen of the touch panel device, which is determined on the basis of a positional relationship between the touch panel and a window frame of the casing which defines the input and display screen when the touch panel is incorporated in the casing, it is necessary to verify nonoccurrence of any destructions such as tear of the transparent conductive film 104A on the film side even when the pen is slid on the film 102 in the area used for the input and display screen.

Therefore, conventionally, pressure has actually been applied on the touch panel to inspect its durability by using a device (X-Y plotter) similar to that shown in FIG. 4, as shown in JP(A)-11-119900. The X-Y plotter of FIG. 4 in the conventional technique includes an arm 112 holding a pen member 111, and a drive unit 113 which drives the arm 112 along the surface of a touch panel 114 (X-Y plane (see FIG. 4)). The pen member 111 is held by the arm 112 so as to be moved in a direction (Z direction) vertical to the surface of the touch panel 114. Accordingly, predetermined pressure can be applied on the touch panel 114 by the pen member 111.

However, the conventional technique has had the following inconveniences. First, because the X-Y plotter cannot greatly move the position of a pen tip up and down, when a touch panel incorporated with a casing to form a touch panel device is inspected, the touch panel device having an excessively large or small thickness may cause a problem of impossibility of carrying out inspection. That is, durability of the touch panel on the pen sliding can be inspected for the touch panel used alone by the X-Y plotter in which the pen tip thereof is replaced by a dedicated pen for the touch panel. However, depending on a thickness of the touch panel device, a problem may occur where the pen tip does not reach an input surface of the touch panel device, or there is not enough distance between the pen tip and the input surface of the touch panel device so that the casing impedes an operation of the X-Y plotter.

Additionally, determination of a sliding position on the touch panel in an incorporated state into the casing by calculation makes it necessary to consider all of dimensional tolerance of the touch panel itself, dimensional tolerance of the device casing, and tolerance in incorporation of the touch panel in the device casing, consequently causing a problem of impossibility of carrying out accurate positioning.

SUMMARY OF THE INVENTION

An object of the present invention is to provide a highly versatile touch panel inspection device capable of rectifying the inconveniences of the conventional technique, especially dealing with a touch panel device of every thickness.

According to the present invention, a touch panel inspection device comprises: a stage having a mounting surface for mounting thereon a touch panel or a touch panel device having the touch panel installed in a casing; two column members disposed on the stage so as to be positioned in both sides of the touch panel or the touch panel device and extended upward from the stage when the touch panel or the touch panel device is mounted on the stage; a rail member disposed above the stage approximately in parallel to the mounting surface of the stage while both ends of the rail member are locked to the two column members by locking means; a support member pivotally supported rotatably around the rail member; an arm member having a predetermined length and integrally engaged with the support member in vertical to the rail member; and a pen member having an approximately conical tip and engaged with a tip of the arm member. A constitution is employed where the locking means are movable up and down along the column members with respect to the stage to lock the rail member in optional positions of the column members.

According to the aforementioned constitution, depending on a thickness of the touch panel or touch panel device mounted on the stage, the positions of the locking means are moved along the column members to adjust heights of the locking means, whereby a distance between the rail member and the touch panel can be changed. The pen member disposed on the tip of the arm member is rotated around the rail member to abut its tip against the touch panel. Thus, the tip of the pen member can be abutted on a touch panel of various thickness. As a result, it is possible to execute inspection of durability or the like by applying predetermined pressure on a touch surface of the touch panel.

Preferably, the rail member is formed into a bar shape having an approximately constant diameter, and the support member is movably supported on the rail member along a longitudinal direction of the rail member. Thus, since the support member supported on the rail member can be moved in parallel to the rail member, it is possible to slide the pen member positioned on the tip thereof while it is abutted on the touch surface of the touch panel.

Preferably, the column members are disposed on the stage so as to be moved in parallel to the mounting surface of the stage. Thus, the column members can be moved with respect to the stage, and the position of the rail member can be moved in the extending direction of the arm member. That is, since the position of the pen member disposed on the tip of the arm member can be moved, an abutting position of its tip on the touch panel can be moved optionally.

More preferably, the pen member is disposed on the tip of the arm member by pen angle setting means for setting and holding the pen member at an optional angle on the same plane as a rotational plane of the support member. Alternatively, the pen member is disposed on the tip of the arm member by pen angle setting means for setting and holding the pen member at an optional angle on a plane vertical to a rotational plane of the support member. Further, the pen angle setting means is preferably provided with angle reference means which functions as a reference for measuring a set angle of the pen member. Thus, since the pen member can be set at various angle and a pressing angle of the pen member on the touch panel can be set optionally, it is possible to set various inspection situation.

Preferably, weighting means having a predetermined weight is disposed in an end of the pen member. Thus, since a rotating force is further applied by the weighting means disposed on the end of the pen member while the tip of the pen member supported on the rail member is abutted on the touch panel, the touch panel can be pressed by larger pressure. As a result, the pressing situation on the touch panel can be changed suitably, and it is possible to execute inspection by setting various situation.

DETAILED DESCRIPTION OF THE PREFERRED EMBODIMENTS

[First Embodiment]

Figure 1:
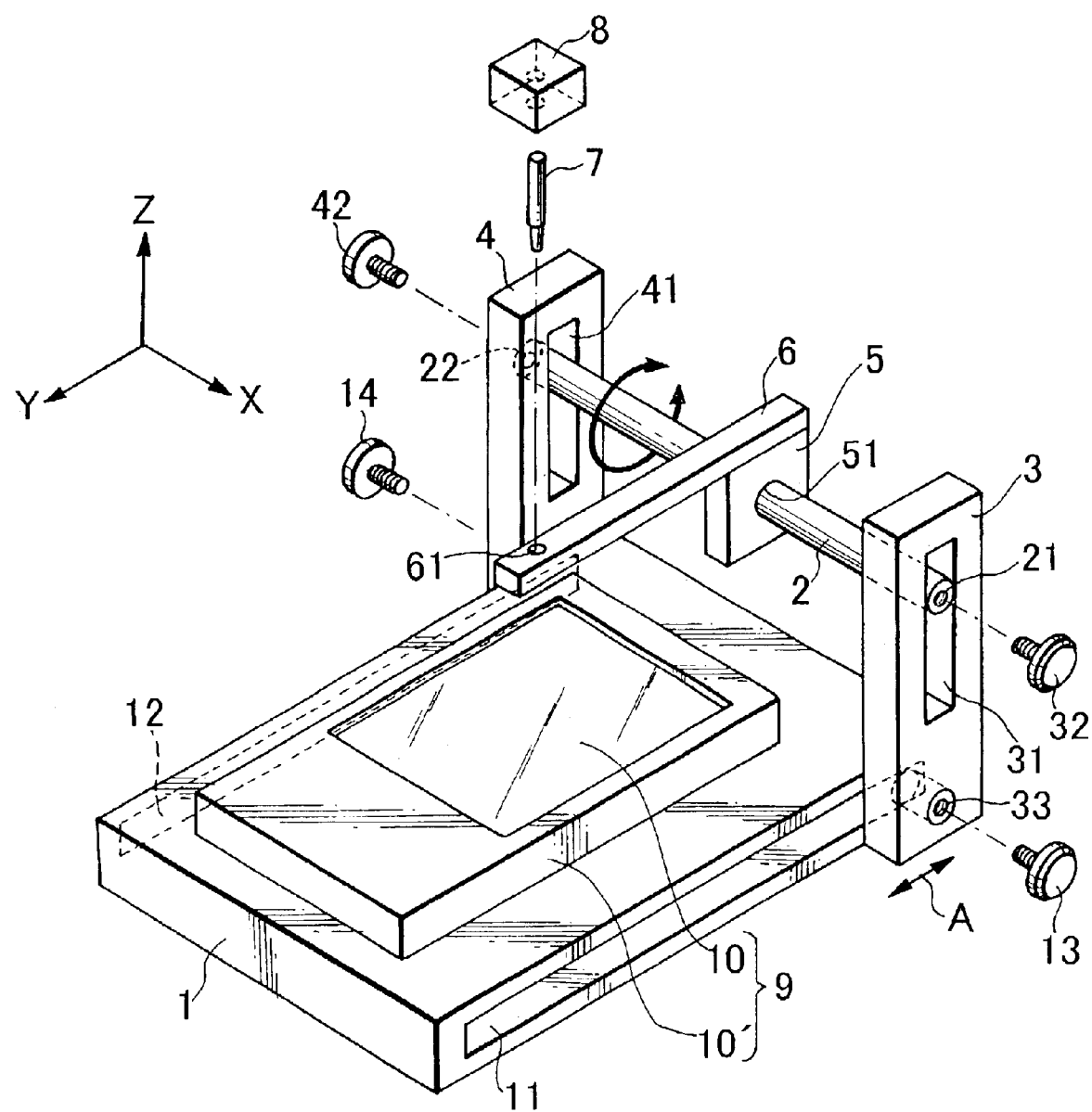
FIG. 1 is a perspective view showing an appearance of a first embodiment of the present invention.

Next, a first embodiment of the present invention will be described by referring to FIG. 1. FIG. 1 is a perspective view showing an appearance of the first embodiment of the invention.

As shown in FIG. 1, a touch panel inspection device of the present invention comprises a stage 1 for mounting a touch panel device 9 thereon, two column members 3, 4 attached to the stage 1 on the respective side faces thereof so as to be positioned in both sides of the touch panel device 9 when the touch panel device 9 is mounted on the stage 1 and extended upward from the stage 1, a rail member 2 disposed above the stage 1 approximately in parallel with a touch panel mounting surface thereof while both ends of the rail member 2 are locked in the two column members 3, 4 by locking means 32, 42, a support member 5 supported rotatably around the rail member 2, an arm member 6 having a predetermined length and integrally engaged with the support member 5 vertically to the rail member 2, and a pen member 7 having an approximately conical tip and engaged with a tip of the arm member 6. The touch panel device 9 comprises a touch panel 10 and a casing 10'. Instead of the touch panel device 9, the touch panel 10 alone may be mounted on the stage 1.

The touch panel inspection device is used for evaluating durability performance against destruction such as tear of a transparent conductive film on a film side of the touch panel 10 by sliding the pen member 7 on a touch surface (surface of the film side) of the touch panel 10 of the touch panel device 9 mounted on the stage 1.

(Touch Panel)

The touch panel 10 which is an inspection target of the device is a pressure-sensitive touch panel using resistance film similar to that described above with reference to the conventional technique. That is, transparent conductive films are disposed on opposing surfaces of a glass and a film set to face each other by a certain space. Voltage is applied to each of the conductive films in X, Y directions (see FIG. 1) respectively, and an input position (pen-touched position) in coordinates is detected by contact between the conductive films. The touch panel 10 of such a type and the touch panel device 9 has conventionally been used, and thus its description is omitted here.

(Stage)

The stage 1 is an approximately rectangular parallelepiped, i.e. box-shaped member, for mounting the touch panel device 9 to be inspected on its upper surface. The surface for mounting the touch panel device 9 thereon is approximately horizontal. On a pair of side faces approximately vertical to the device mounting surface, engaging grooves 11, 12 are formed to engage the column member 3, 4. The engaging grooves 11, 12 having a depth direction opposite each other are formed linearly along the respective side faces.

Figure 5:
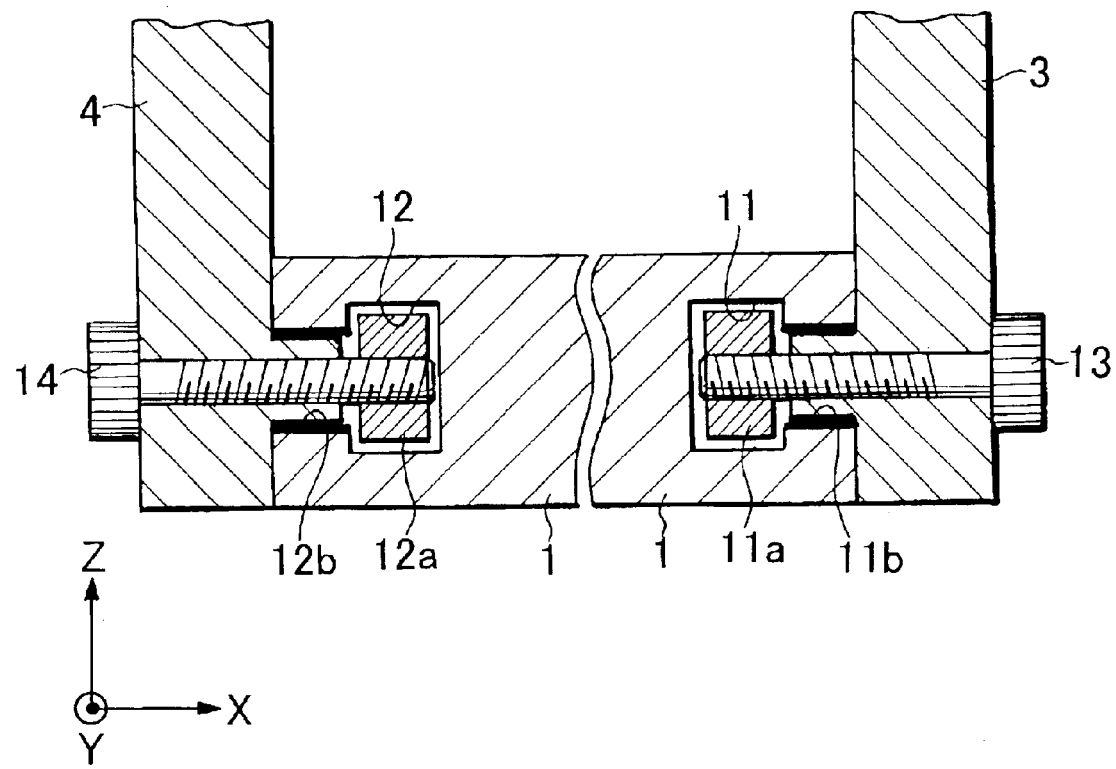
FIG. 5 is a partial and cross-sectional view of FIG. 1 taken along X-Z plane.

As shown in FIG. 5, inside the engaging grooves 11, 12, moving pieces 11a, 12a having screw holes are disposed so as to be moved along the engaging grooves 11, 12, respectively. The moving pieces are for example circular nut-shaped, and the screw holes are disposed vertically to the side faces of the stage 1. To retain the moving pieces 11a, 12a inside the engaging grooves 11, 12, projections 11b, 12b are formed to reduce widths of the engaging grooves 11, 12 in the vicinities of the side faces of the stage 1. That is, the engaging grooves 11, 12 are formed so that their widths are set to receive the moving pieces 11a, 12a having the screw holes at the inner side, and to be smaller than outer diameters of the moving pieces 11a, 12a while larger than the screw holes thereof near the side faces of the stage 1. Accordingly, as described later, screws of screw members 13, 14 for fixing the column members 3, 4 are inserted into the engaging grooves 11, 12 to be screwed into the screw holes of the moving pieces 11a, 12a located in the engaging grooves 11, 12.

The stage 1 of the embodiment is formed to be a thick rectangular plate in shape as shown in FIG. 1. However, the stage 1 is not limited to this shape. FIG. 1 shows the example where the column members 3, 4 are engaged with the side faces of the long sides of the stage 1. However, the engagements of the column members 3, 4 are not limited to these positions. Further, the moving pieces 11a, 12a in the engaging grooves 11, 12 may be driven by an electric motor through a belt or the like to be moved. This technology is well-known, and thus its description is omitted here.

(Column Member)

The column members 3, 4 engaged with the side faces of the stage 1 are both square pillar, and bottom surface shape thereof is rectangular. The column members 3, 4 are fixed to the stage 1 by the screw members 13, 14 so that abut one surface thereof in the vicinity of each bottom surface abuts against the side face of the stage 1. That is, in the column members 3, 4, screw holes 33 (one is not shown) are formed in positions corresponding to the engaging grooves 11, 12 formed in the side faces of the stage 1 when the column members 3, 4 are attached onto the side faces of the stage 1. Thus, the screws screwed in and put through the screw holes 33 of the column members 3, 4 are inserted into the engaging grooves 11, 12 of the stage side faces. Then, the inserted screw members 13 are engaged with the moving pieces 11a, 12a in the engaging grooves 11, 12, whereby the column members 3, 4 can be moved along the engaging grooves 11, 12 while abutting against the stage side faces. In other words, the column members 3, 4 can be moved on the side faces of the stage 1 (see arrow A in FIG. 1 showing the moving direction of the column members 3, 4).

In this case, the column members 3, 4 are disposed on the stage 1 by setting their longitudinal directions in vertical to the touch panel device mounting surface of the stage 1, i.e., in a Z direction of FIG. 1 (see FIG. 1). In order to ensure such an angular relationship between the column members 3, 4 and the stage 1, the column members 3, 4 has projections each having a pair of parallel surfaces being in slidable contact with the upper and lower parallel surfaces of the projections 11b, 12b of the engaging grooves 11, 12, as shown in FIG. 5.

Above the screw holes 33 of the column members 3, 4, approximately rectangular slots 31, 41 are formed so as to be extended up and down along the column members 3, 4, i.e., in the longitudinal directions thereof (Z direction). As in the case of the screw holes 33, the slots 31, 41 are bored through to be vertical to the side faces of the stage 1.

The slots 31, 41 are formed so that their widths are larger than an outer diameter of the rail member 2 so as to be capable of inserting the rail member 2, and smaller than diameters of screw heads of screw members (locking means) 32, 42 screwed into the screw holes formed at both ends of the rail member 2 on the center line thereof. Accordingly, the screw members 32, 42 are driven in from the outside of both column members 3, 4, whereby the rail member 2 can be locked in optional positions of the slots 31, 41 by frictional forces between the screw heads of the screw members 32, 42 and the surfaces of the column members 3, 4.

(Rail Member)

The rail member 2 is cylindrical, and formed so that its length is longer than a distance between both side faces of the stage 1 in which the engaging grooves 11, 12 are formed, and shorter than an outer dimension of the device in the engaged state of both column members 3, 4 with the stage 1, i.e. a length of addition of a thickness of the two column members to a distance of a short side of the stage 1. In both ends thereof, screw holes 21, 22 having predetermined depths are formed on the center line of the cylindrical rail member 2. The screws of the screw members 32, 42 as locking means for locking the rail member 2 onto the column members 3, 4 in optional height are screwed into the screw holes 21, 22 as described above. Here, the rail member 2 of the embodiment has a certain diameter, but it is not limited to this diameter.

(Support Member)

The support member 5 is an approximately square-shaped plate member having a predetermined thickness. An insertion hole 51 having a diameter larger than that of the rail member 2 into which the rail member 2 is inserted is formed on its center. That is, the support member 5 is rotatably supported on the rail member 2. Additionally, the support member 5 can be moved along the rail member 2 if the rail member 2 is uniform in diameter.

(Arm Member)

The arm member 6 made of a bar-shaped material rectangular in cross-section is integrally fixed to one side face of the approximately square-shaped support member 5. Because of its engagement with the side face of the support member 5, the arm member 6 is rotated integrally with the support member 5 around the rail member 2. In this case, the arm member 6 is approximately in perpendicular to the rail member 2.

In the vicinity of the tip end of the arm member 6, a pen holding hole 61 is formed for inserting and holding the pen member 7 having a predetermined length to press the touch surface of the touch panel 10. This hole 61 is formed approximately in vertical to the touch panel mounting surface of the stage 1 when the arm member 6 is in a parallel positional relationship with the upper surface of the stage 1 (positional relationship similar to that shown in FIG. 1). To hold the pen member 7, the hole 61 has, for example, dimensional tolerance for fitting with the diameter of the pen member 7, or a shape for tightly holding the pen member 7. However, the hole 61 is not limited to this shape.

(Pen Member)

The pen member 7 is a cylindrical bar member having a predetermined length. This pen member 7 slides on the touch surface of the touch panel 10, and its tip is conical as in the case of a used pencil or a felt pen. Additionally, the pen member 7 is held by the pen holding hole 61 in a portion other than the conical tip.

(Weighting Means)

A weight 8 which is weighting means having a predetermined weight is disposed in another end opposite the end of the pen member 7 for pressing the touch panel 10. Advisably, this weighting means is for a weight considering writing pressure (pressing force) when a human being touches the touch panel by using the touch panel dedicated pen. In this weighting means 8, for example a hole having a diameter approximately equal to that of the pen member and a predetermined depth is formed. By inserting the above another end of the pen member 7 into this hole, a weight of the weighting means is applied on the pen tip when the pen tip of the pen member 7 comes below.

(Operation)

Next, an operation of the embodiment will be described. First, the dedicated pen member 7 for the touch panel 10 is fixed to the tip of the arm member 6, and the weighting means 8 is fixed to the arm member 6, i.e. the pen member 7. The total weight of both the arm member 6 and the pen member 7 forms a dead weight, and the weight of the weighting means 8 is set to a value so that a total weight of both the weighting means 8 and the dead weight becomes a value necessary for inspection.

Subsequently, the touch panel device 9 in which the touch panel 10 is installed is mounted on the stage 1. In this case, the touch panel 10 is located so that an optional side (end of the touch panel) of the transparent conductive film of the touch panel 10 to carry out a durability test is in parallel to the rail member 2. That is, the side to be tested is positioned in vertical to the arm member 6.

Subsequently, the rail member 2 is adjusted for height so as to place the tip of the pen member 7 on the surface of the touch panel 10, and fixed to the column members 3, 4 by the screw members (locking means) 32, 42. In order to position the pen tip of the pen member 7 in a predetermined side on the touch panel 10 which is in parallel to the rail member 2, a position of the column members 3, 4 with respect to the stage 1 is moved along the engaging grooves 11, 12 formed in the side faces of the stage 1.

Then, since the arm member 6 is freely rotated around the rail member 2, the dead weight and the weight of the weighting means 8 are transmitted from the pen member 7 to the touch panel 10, whereby a predetermined pressing force can be applied. In this case, the support member 5 is slid along the rail member 2 by a necessary number of times. Accordingly, an optional weight adjusted by the weighting means 8 and applied on the tip of the pen member 7 enables sliding of the pen member 7 on the touch surface along one side thereof.

Then, after inspection of a predetermined touch panel device 9, inspection of another touch panel device 9 different in thickness and size can be quickly dealt with. That is, if the touch panel device 9 to be tested becomes slightly thin or thick, the support member 5 is rotated to change a height of the pen tip of the pen member 7 so that it abuts on the touch surface of the touch panel. If a change in thickness is large, or if the pen tip is intended to abut vertically on the touch surface, it can be dealt with by changing the height of the rail member 2. Additionally, if a side of the touch panel 10 for inspection, i.e. a panel inspection position along the X direction in FIG. 1, is intentionally changed, it can be easily executed by moving Y-direction positions of the column members 3, 4 along the engaging grooves of the stage 1.

In the aforementioned manner, for the durability test of the film side transparent conducive films of the touch panel by the dedicated pen, the rail member 2 can be adjusted in the optional height from the stage 1 to be fixed to the slots 31, 41 disposed in the column members 3, 4, whereby the inspection can be executed while the touch panel 10 is installed in the casing or the like without any dependence on the thickness of the touch panel 10 itself. Thus, it is possible to improve versatility.

The pen member 7 can be moved to the optional position by moving the position of the support member 5 along the rail member 2, or moving the column members 3, 4 to the optional positions of the engaging grooves 11, 12 disposed in the side faces of the stage 1. Thus, sliding inspection can be carried out on the entire touch panel surface.

The side faces of the stage 1 are not limited to ones formed with the engaging grooves 11, 12. Instead, a plurality of screw holes (not shown) corresponding to the screw holes 33 or the like formed in the column members 3, 4 may be formed at predetermined intervals. That is, each time the column members 3, 4 are moved, the screw members 13, 14 may be screwed into the screw holes of the column members 3, 4 and the screw holes of the side faces of the stage 1. In this way, the positions of the column members 3, 4, i.e. the potion of the tip of the pen member 7, can be moved, whereby a durability test of the touch panel 10 can be executed.

Furthermore, the touch panel inspection device may comprise support member driving means (not shown) for moving the support member 5 along the rail member 2. Then, an operation of the driving means is controlled by a computer to enable easy execution of the inspection.

Durability of the touch panel is determined by using a computer wherein positional values in X-Y coordinate system detected by the touch panel and input to the computer are compared with the pen-touched positions in the X-Y coordinate system, and deviation of the detected positional values from the pen-touched positions is evaluated, for example, in the same manner as shown in JP(A)-11-119900.

[Second Embodiment]

Figure 2:
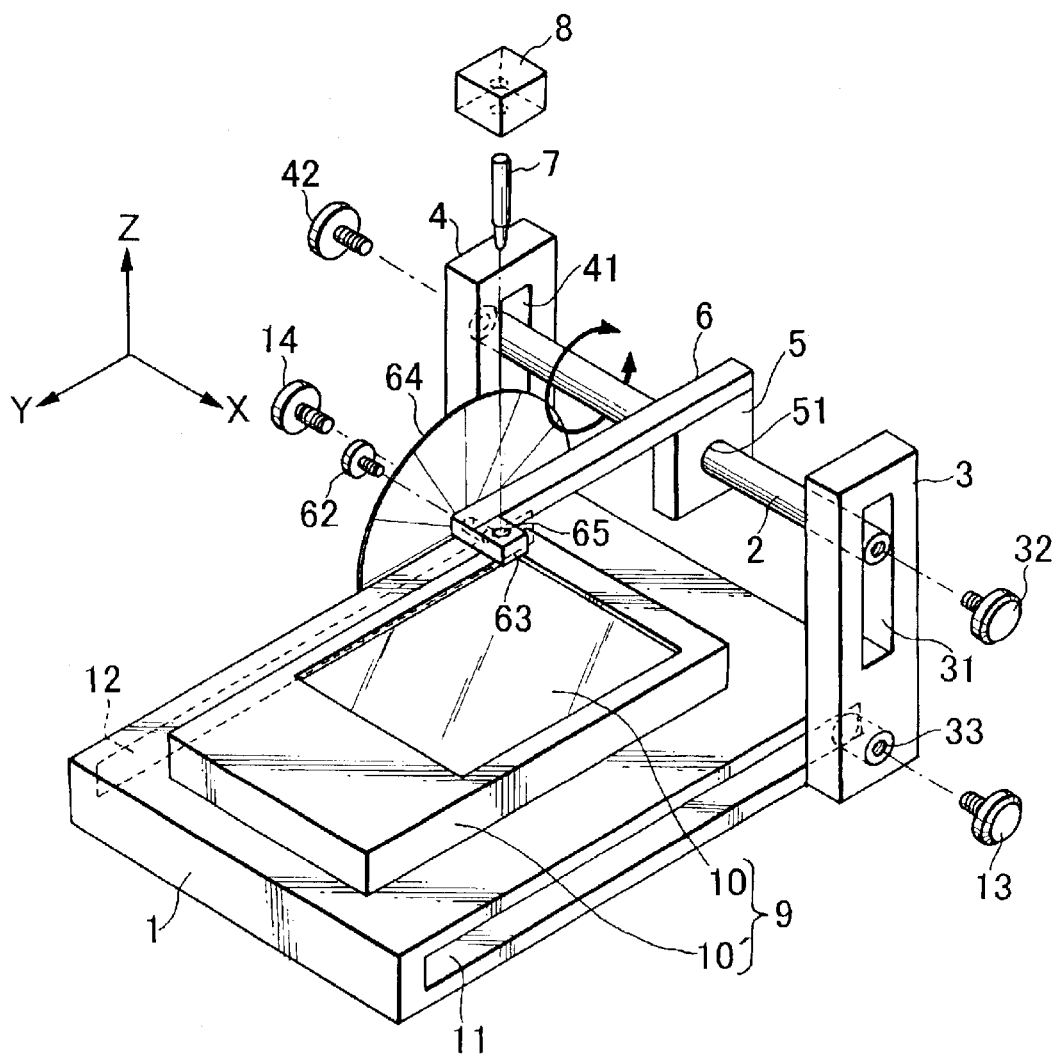
FIG. 2 is a perspective view showing an appearance of a second embodiment of the present invention.
Figure 3:
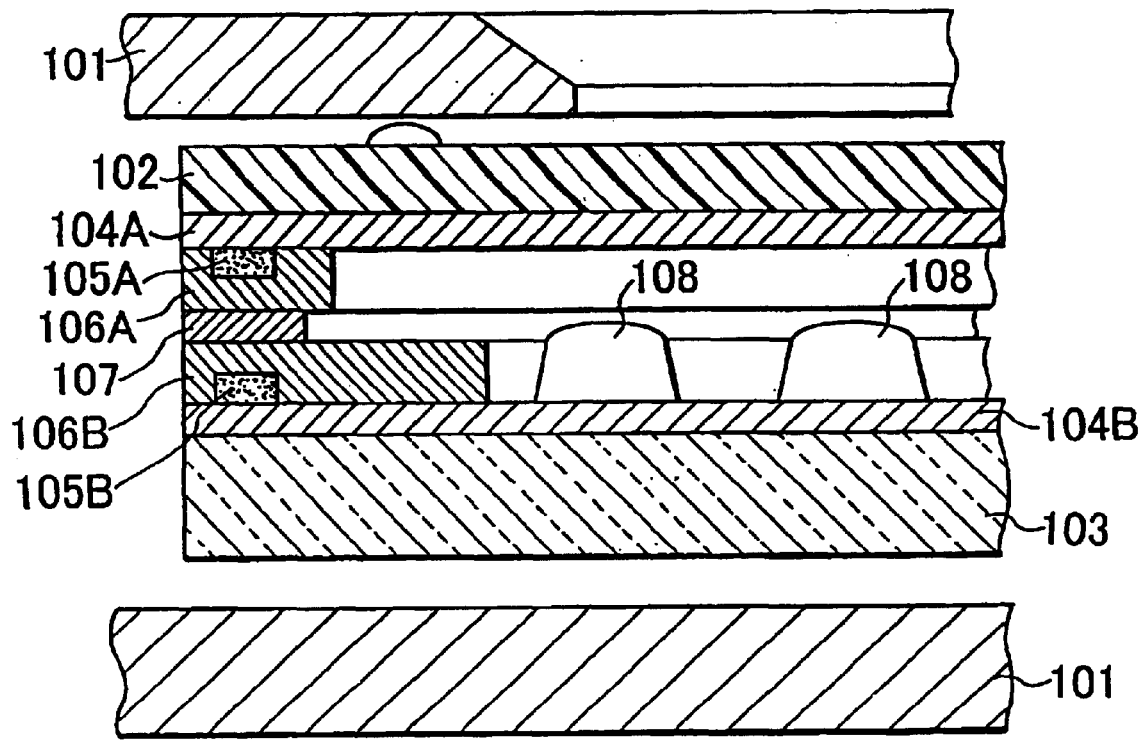
FIG. 3 is a cross-sectional view showing a constitution of a conventional touch panel.
Figure 4:
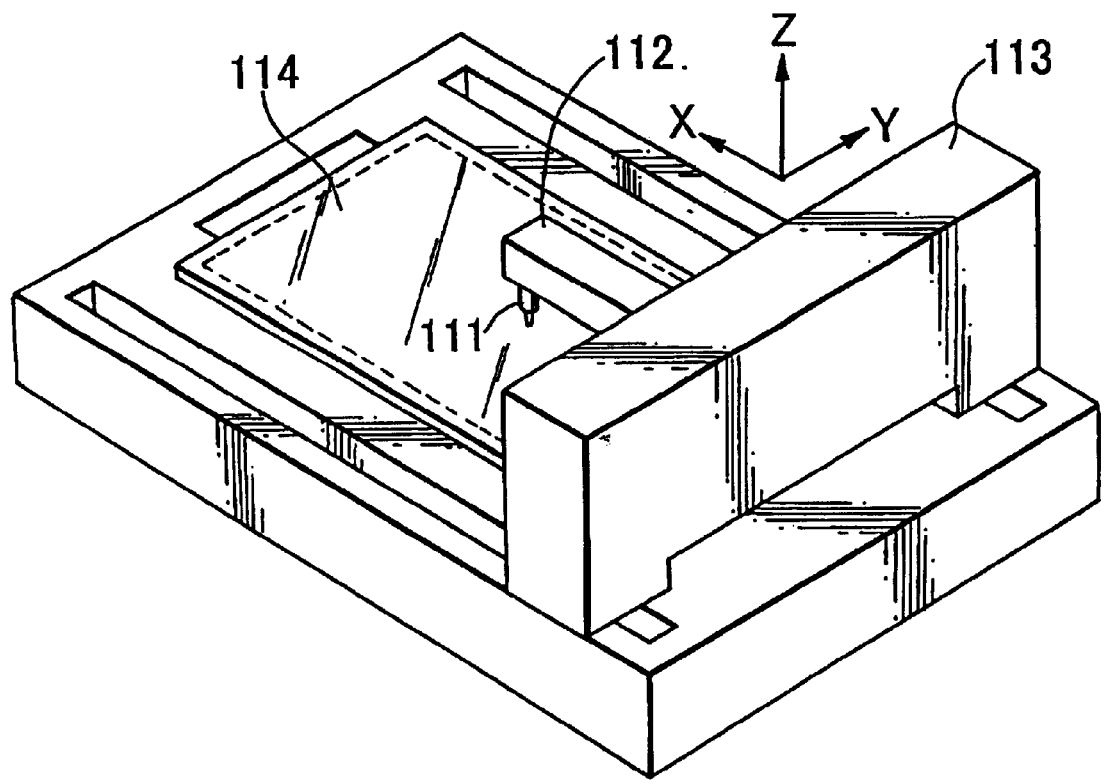
FIG. 4 is a perspective view showing an appearance of an X-Y plotter of the conventional technique.

Next, a second embodiment of the present invention will be described by referring to FIG. 2. FIG. 2 is a perspective view showing an appearance of the second embodiment of the invention.

A touch panel inspection device of the second embodiment comprises components approximately similar to those of the device of the first embodiment. According to the second embodiment, the device further comprises pen angle setting means 62, 63 disposed at the tip of the arm member 6 to enable attachment of the pen member 7 at an optional angle. Additionally, the pen angle setting means 62, 63 are provided with angle reference means 64 which becomes a reference for measuring a set angle of the pen member 7.

For example, as shown in FIG. 2, the pen angle setting means 62, 63 are constituted of a screw hole (not shown) formed in the tip of the arm member 6 and bored through in the same direction as the axial direction of the rail member 2, a screw member 62 put through the screw hole, and a rectangular parallelepiped joint 63 engaged with the tip of the arm member 6 by the screw member 62 which is put therethrough. The joint 63 is rotated around the screw member 62 on the same plane (Y-Z plane) as the rotational plane of the support member 5. In the joint 63, a hole 65 similar to the pen holding hole 61 is formed to hold the pen member 7. Thus, the rotation of the joint 63 enables rotation of the pen member 7 on the Y-Z plane in FIG. 2. By fastening the screw member 62, the pen member 7 can be locked at an optional angle.

The angle reference means 64 disposed in the vicinity of the tip of the arm member 6 is for example a protractor. The protractor 64 of FIG. 2 is formed to be a transparent plate. However, it needs not be transparent.

Thus, the pen member 7 can be set at the optional angle when it abuts against the input surface (touch surface) of the touch panel 10. It is possible to set various conditions which enable testing of effects on the film side transparent conductive films with respect to the input angle of the pen member 7, effects on the film side transparent conductive films etc.

The pen angle setting means 62, 63 shown in FIG. 2 are not limited to the aforementioned means which enable the rotation of the pen member 7 in the Y-Z plane. Means may be employed which enable rotatable holding of the pen member 7 in an X-Z plane. That is, the pen member 7 may be disposed in the tip of the arm member 6 by the pen angle setting means for setting the pen member 7 at an optional angle in a plane vertical to the rotational plane of the support member 5. In such a case, for example, a fixing hole having a predetermined diameter is formed in the tip end face of the arm member 6, and the joint 63 is disposed to abut against the tip end surface. On a surface of the joint 63 facing the arm member 6, a bar-shaped projection is formed so as to be fitted in the fixing hole. Accordingly, by setting the joint 63 to which the pen member 7 is fixed at an optional angle in the X-Z plane and inserting and fitting it in the fixing hole, the pen member can be fixed at this angle. Also in this way, a pressing angle of the pen member 7 on the input surface (touch surface) of the touch panel 10 can be optionally set. However, the method of attaching the joint 63 is not limited to the foregoing.

The constitution and function of the present invention have been described. According to the invention, depending on the thickness or the like of the touch panel device mounted on the stage, the positions of the locking means are moved along the column members to adjust the height of the locking means. Thus, the distance between the rail member and the touch panel can be changed. Since the pen member disposed in the tip of the arm member is rotated around the rail member to allow its tip to abut against the touch panel, the tip of the pen member can abut against the touch panel of the touch panel device having various thickness and size. Thus, it is possible to improve versatility, i.e. a capability of executing inspection on durability or the like by applying predetermined pressure on the touch surface of the touch panel. These excellent effects have not been possible in the conventional technique.

Since the pen member can be moved to an optional position by setting the support member movable with respect to the rail member and setting the column members movable with respect to the stage, it is possible to easily execute inspection of the entire surface of the touch panel.

Since the angle of the pen member can be optionally adjusted, the pressing angle for the touch panel can be optionally set to enable setting of various inspection situation. Thus, it is possible to execute various inspections.

Furthermore, since the end of the pen member is provided with the weighting means having the predetermined weight, pressure of the pen member to press the surface of the touch panel can be optionally set. Thus, it is possible to further diversify inspection modes.

What is claimed is:

1. A touch panel inspection device comprises:
    a stage having a mounting surface for mounting thereon a touch panel or a touch panel device having the touch panel installed in a casing;
    two column members disposed on the stage so as to be positioned in both sides of the touch panel or the touch panel device and extended upward from the stage when the touch panel or the touch panel device is mounted on the stage;
    a rail member disposed above the stage approximately in parallel to the mounting surface of the stage while both ends of the rail member are locked to the two column members by locking means;
    a support member pivotally supported rotatably around the rail member;
    an arm member having a predetermined length and integrally engaged with the support member in vertical to the rail member; and
    a pen member having an approximately conical tip and engaged with a tip of the arm member,
    wherein the locking means are movable up and down along the column members with respect to the stage to lock the rail member in optional positions of the column members.

2. The touch panel inspection device according to claim 1, wherein the rail member is formed into a bar shape having an approximately constant diameter, and the support member is movably supported on the rail member along a longitudinal direction of the rail member.

3. The touch panel inspection device according to claim 1, wherein the column members are disposed on the stage so as to be moved in parallel to the mounting surface of the stage.

4. The touch panel inspection device according to claim 1, wherein the pen member is disposed on the tip of the arm member by pen angle setting means for setting and holding the pen member at an optional angle on the same plane as a rotational plane of the support member.

5. The touch panel inspection device according to claim 4, wherein the pen angle setting means is provided with angle reference means which functions as a reference for measuring a set angle of the pen member.

6. The touch panel inspection device according to claim 1, wherein the pen member is disposed on the tip of the arm member by pen angle setting means for setting and holding the pen member at an optional angle on a plane vertical to a rotational plane of the support member.

7. The touch panel inspection device according to claim 6, wherein the pen angle setting means is provided with angle reference means which functions as a reference for measuring a set angle of the pen member.

8. The touch panel inspection device according to claim 1, wherein weighting means having a predetermined weight is disposed in an end of the pen member.

* * * * *